United States Patent
Van Es et al.

(10) Patent No.: US 9,327,433 B2
(45) Date of Patent: May 3, 2016

(54) PROCESS FOR COMPACTING POLYMERIC POWDERS

(75) Inventors: Martin Antonius Van Es, Landgraaf (NL); Niels Hubertus Maria Eussen, Sint Geertruid (NL); Ronny Jacob Jensz, Landgraaf (NL)

(73) Assignee: DSM IP ASSETS B.V., Heerlen (NL)

( * ) Notice: Subject to any disclaimer, the term of this patent is extended or adjusted under 35 U.S.C. 154(b) by 436 days.

(21) Appl. No.: 13/876,289

(22) PCT Filed: Sep. 29, 2011

(86) PCT No.: PCT/EP2011/066978
§ 371 (c)(1),
(2), (4) Date: Jun. 26, 2013

(87) PCT Pub. No.: WO2012/041957
PCT Pub. Date: Apr. 5, 2012

(65) Prior Publication Data
US 2013/0284006 A1   Oct. 31, 2013

(30) Foreign Application Priority Data

Sep. 29, 2010  (EP) .................................... 10181703

(51) Int. Cl.
| | |
|---|---|
| *B29C 43/00* | (2006.01) |
| *B29C 43/26* | (2006.01) |
| *B29C 43/22* | (2006.01) |
| *F41H 5/02* | (2006.01) |
| *B29C 43/48* | (2006.01) |
| *B29K 23/00* | (2006.01) |
| *B29K 105/00* | (2006.01) |

(52) U.S. Cl.
CPC ................ *B29C 43/26* (2013.01); *B29C 43/00* (2013.01); *B29C 43/003* (2013.01); *B29C 43/22* (2013.01); *F41H 5/02* (2013.01); *B29C 2043/483* (2013.01); *B29K 2023/0683* (2013.01); *B29K 2105/251* (2013.01); *B29K 2223/0683* (2013.01)

(58) Field of Classification Search
None
See application file for complete search history.

(56) References Cited

U.S. PATENT DOCUMENTS

| | | | |
|---|---|---|---|
| 2008/0251960 A1* | 10/2008 | Harding et al. ................ | 264/119 |
| 2011/0076440 A1* | 3/2011 | Steeman ......................... | 428/98 |
| 2011/0095447 A1 | 4/2011 | Peters | |

FOREIGN PATENT DOCUMENTS

WO    WO 2009/153318    12/2009

OTHER PUBLICATIONS

International Search Report for PCT/EP2011/066978 mailed Jan. 12, 2012.

* cited by examiner

*Primary Examiner* — Mary F Theisen
(74) *Attorney, Agent, or Firm* — Nixon & Vanderhye P.C.

(57) ABSTRACT

The invention relates to a process for compacting a polymeric powder in a press, wherein the polymeric powder is supported during compaction by a powder carrier, characterized in that said powder carrier comprises a layer of thickness (T), said layer comprising a material with a static coefficient of friction (COF), and wherein T×COF is at least 10 µm. The invention also relates to a compacted polymeric powder obtainable with the above process.

18 Claims, 3 Drawing Sheets

Figure 3
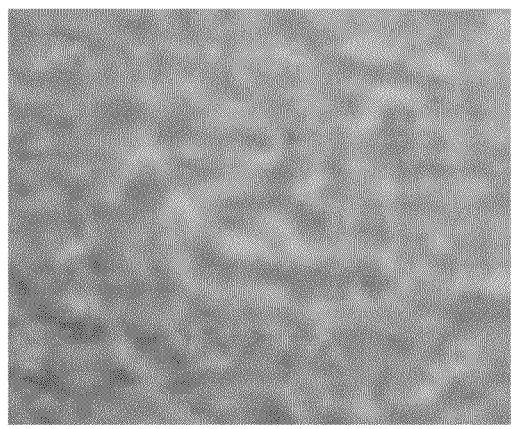 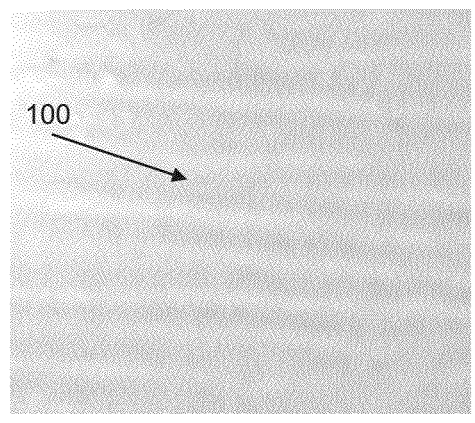
Figure 3(a)
Figure 3(b)
(Prior Art)

PROCESS FOR COMPACTING POLYMERIC POWDERS

This application is the U.S. national phase of International Application No. PCT/EP2011/066978 filed 29 Sep. 2011 which designated the U.S. and claims priority to EP 10181703.9 filed 29 Sep. 2010, the entire contents of each of which are hereby incorporated by reference.

FIELD

The present invention relates to a process for compacting a polymeric powder in a press wherein a powder carrier supports the polymeric powder during compaction. The invention also relates to a compacted polymeric powder.

BACKGROUND AND SUMMARY

Compacting polymeric powders is a well known process. An example thereof is known from WO 2009/153,318 wherein a polymeric powder is compressed in an isobaric press at a temperature below the melting point of the powder. WO 2009/153,318 also mentions that a carrier material may be used to support the polymeric powder during compaction.

It was observed that the process of WO 2009/153,318 like other known processes for compacting polymeric powders has a reduced efficiency in achieving a homogeneous compaction of the polymeric powder. It was further observed that the compacted polymeric powders obtained with known processes show rather large density variations across their surface, a phenomenon known as ribbing. It is also known that the phenomenon of ribbing may affect in a deleterious way the mechanical properties of various products obtained by further processing the compacted polymeric powder.

An aim of the invention may be to provide a process for compacting polymeric powders, which shows the mentioned disadvantages to a lesser extent.

The present invention provides a process for compacting a polymeric powder in a press, wherein the polymeric powder is supported during compaction by a powder carrier, wherein said powder carrier comprises a layer of a thickness (T), said layer comprising a material with a static coefficient of friction (COF), and wherein T×COF is at least 10 μm.

It was observed that the process of the invention, also referred to as the inventive process, is efficient in achieving a good compaction of the polymeric powder.

In particular it was observed that a compacted polymeric powder obtained by the inventive process shows less ribbing than known compacted polymeric powders. The invention therefore relates also to a compacted polymeric powder obtained by the inventive process.

BRIEF DESCRIPTION OF THE DRAWINGS

The invention will be further explained with the help of figures and examples without being however limited thereto.

FIG. 3(a) shows a compacted polymeric powder manufactured with the process of the invention and FIG. 3(b) shows a compacted polymer powder manufactured according to known processes such as the process described in WO 2009/158,318.

DETAILED DESCRIPTION

Figure 1:
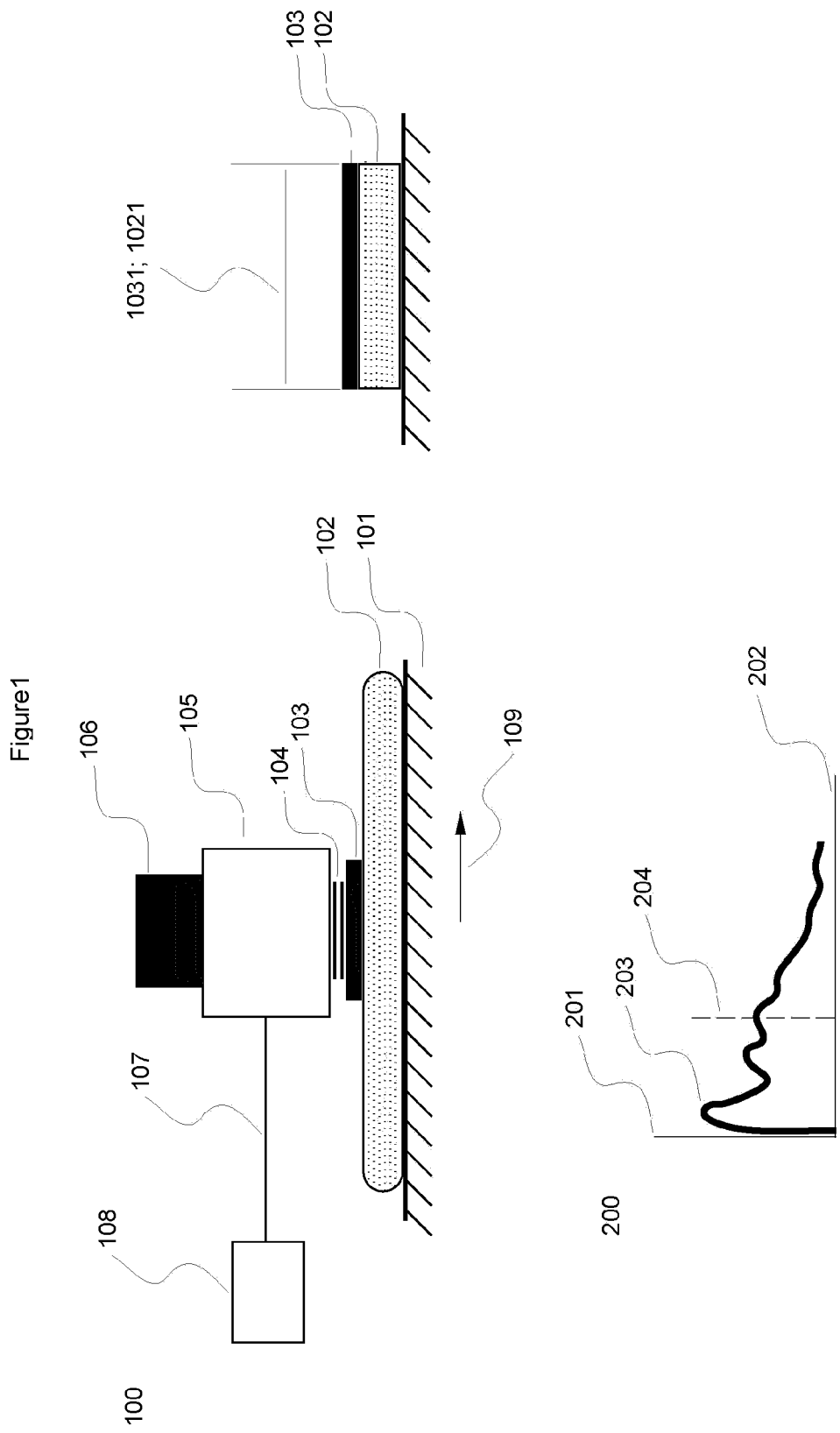
FIG. 1 shows schematically a setup used to determine the COF of a layer of material.
Figure 2:
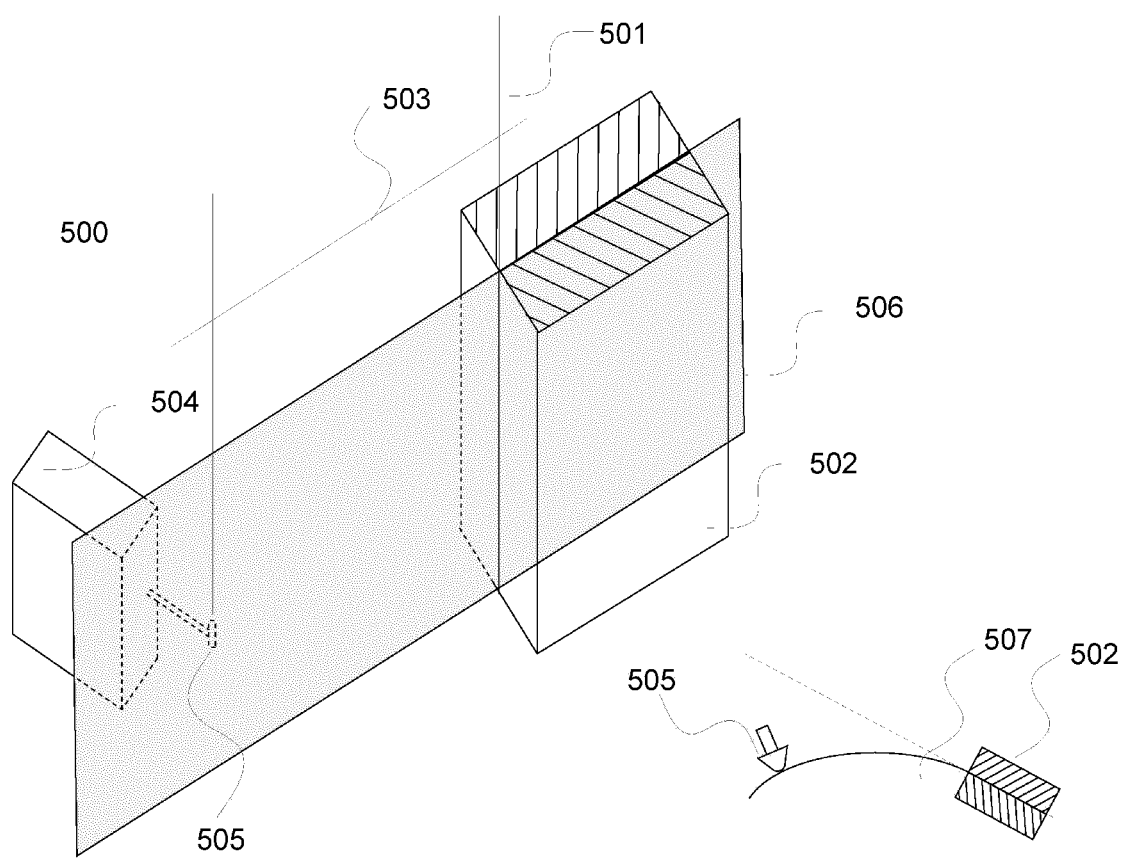
FIG. 2 shows schematically a setup used to determine the bending resistance of a layer of material.

By compacting a polymeric powder is herein understood that the polymeric powder is compacted or compressed to form a cohesive material, i.e. a material that can be subjected to further processing steps such as roll-pressing and/or stretching. Stretching is also often referred to in the art as drawing. By a compacted polymeric powder is herein understood a polymeric powder that is only compacted into a cohesive material, i.e. without being further processed by e.g. roll-pressing and/or stretching.

Preferably, the polymeric powder is compacted with a pressure of at least 2 bars, more preferably of at least 10 bars, even more preferably of at least 35 bars and most preferably of at least 50 bars. Preferably, the polymeric powder is compacted at a temperature of below the melting temperature (Tm) of the polymeric powder. With the term melting temperature (Tm) of a polymeric powder is herein understood the temperature, measured according to ASTM D3418-97 by DSC using a heating rate of 20° C./min, falling in the melting range and showing the highest melting rate.

Various presses can be used to carry out the compaction of polymeric powders, e.g. isochoric or isobaric presses. A preferred isochoric or isobaric press is a double belt press, which is a press wherein the compaction of the polymeric powder is carried out between two endless belts. It was observed however, that very good results were obtained when an isobaric press, and in particular a double belt isobaric press, was used for compaction. When compared with known compacted polymeric powders, compacted polymeric powders according to the invention which were obtained by an inventive process using an isobaric press showed less ribbing and reduced density variations throughout their surface. By isobaric press is herein understood a press wherein the pressure applied to a bed of polymeric powder is independent by the thickness of said bed. This is in contrast with an isochoric press wherein the pressure applied to a bed of polymeric powder varies with the thickness of said bed. Isobaric presses are for example available from Hymmen GmbH (DE).

Preferably, the inventive process comprises a further step of roll-pressing the compacted polymeric powder to form an undrawn polymeric tape and preferably a further step of stretching the undrawn polymeric tape to form a drawn polymeric tape.

The preferred polymeric powders suitable for compaction with the inventive process are powders of polyamides and polyaramides, e.g. poly(p-phenylene terephthalamide); poly (tetrafluoroethylene) (PTFE); poly(p-phenylene-2,6-benzo-bisoxazole) (PBO); liquid crystalline polymers (LCP), e.g. Vectran® (copolymers of para hydroxybenzoic acid and para hydroxynaphtalic acid); poly{2,6-diimidazo-[4,5b-4',5'e]pyridinylene-1,4(2,5-dihydroxy)phenylene}; poly(hexamethyleneadipamide) (known as nylon 6,6), poly(4-aminobutyric acid) (known as nylon 6–); polyesters, e.g. poly(ethylene terephthalate), poly(butylene terephthalate), and poly(1,4 cyclohexylidene dimethylene terephthalate); polyolefins, e.g. homopolymers and copolymers of polyethylene and polypropylene; but also polyvinyl alcohols and polyacrylonitriles.

A more preferred polymeric powder is a powder of polyolefin, more preferably a powder of polyethylene, even more preferably a powder of ultra high molecular weight polyethylene (UHMWPE), most preferably an UHMWPE powder having an IV of preferably at least 2 dl/g, more preferably at least 3.5 dl/g, most preferably at least 5 dl/g. Preferably the IV of said UHMWPE powder is at most 40 dl/g, more preferably at most 25 dl/g, more preferably at most 15 dl/g. Preferably, the UHMWPE has less than 1 side chain per 100 C atoms, more preferably less than 1 side chain per 300 C atoms. A further preferred UHMWPE powder is a powder of a polyethylene having a weight average molecular weight (Mw) of at least 100.000 g/mol, preferably also having a Mw/Mn ratio of at most 6, wherein Mn is the number averaged molecular weight. Suitable methods for manufacturing polyethylenes can be found for example in WO 2001/021668 and US 2006/0142521 included herein by reference. A particularly preferred UHMWPE powder is a powder of a highly disentangled UHMWPE obtainable according to a process using the conditions described in WO 2010/007062 pg. 17 and 18, included herein by reference. It was observed that compacted polyethylene powders and in particular compacted UHMWPE powders obtained by the inventive process show further reduced ribbing and density variations throughout their surface.

According to the invention, the polymer used is in a powder form. Suitable polymeric powders are those comprising particles which have an average particle size of up to 1000 μm, preferably of up to 500 μm, more preferably of up to 300 μm. The average size of the particles is preferably at least 1 μm, more preferably at least 10 μm. The particle size distribution and thus the average size of the particles can be determined by a well-known method of laser diffraction (PSD, Sympatec Quixel) as follows. The polymeric powder sample is dispersed into surfactant-containing water and treated ultrasonically for about 30 seconds to remove agglomerates or entanglements between different particles. The sample is pumped through a laser beam and the scattered light is detected. The amount of the scattered light is a measure of the particle size.

Preferably, the polymeric powder has a bulk density determined in accordance with ASTM-D1895 of below 0.6 g/cm$^3$, more preferably of below 0.3 g/cm$^3$, most preferably below 0.2 g/cm$^3$. To improve the handling of the powder, preferably said polymeric powder has a powder bulk density of at least 0.05 g/cm$^3$, more preferably of at least 0.1 g/cm$^3$.

Preferably, in the inventive process the polymeric powder forms a powder bed on the powder carrier, said powder bed having a thickness of at most 60 mm, more preferably at most 20 mm, most preferably at most 10 mm. Preferably, said powder bed has a thickness of at least 1 mm, more preferably at least 2 mm, most preferably at least 3 mm. With the thickness of the powder is herein understood the average thickness of the powder bed as measured with a slide caliper. It was observed that for such thicknesses of the powder bed, the compacted polymeric powders show reduced density variations throughout their surface.

According to the invention, a powder carrier supports the polymeric powder during compaction. The powder carrier comprises a layer having a thickness (T), and wherein said layer comprises a material having a static coefficient of friction (COF). The powder carrier also fulfills the condition of Formula 1:

$$T \times COF \geq 10 \ \mu m \quad \text{Formula 1}$$

the thickness (T) of said layer of material is expressed in micrometers. The static COF is a dimensionless unit and is also referred to herein simply as COF. Preferably, T×COF is at least 12 μm, more preferably at least 14 μm, even more preferably at least 15 μm, most preferably at least 16 μm. The static COF of a material is determined by forming said material into a layer and using a modified version of ASTM D1894-08 as described hereinbelow in the METHODS section.

Preferably, the powder carrier comprises a layer having a top surface for supporting the polymeric powder and a bottom surface, and wherein the material having the COF and comprised by said layer forms the top surface of said layer and is in contact with the polymeric powder.

Preferably, the powder carrier essentially consists of said layer; more preferably, the powder carrier consists of said layer. Preferably said layer essentially consists of said material, more preferably said layer consists of said material.

Although simply referred to herein as material, said material may also be a composition of matter, i.e. a composition comprising different materials, wherein said composition of matter when formed into a layer has a certain COF as determined with the modified ASTM D1894-08.

Preferably, the COF of the material used to manufacture the powder carrier is at least 0.03, more preferably at least 0.06, most preferably at least 0.09. Preferably, said COF is at most 0.6, more preferably at most 0.4, most preferably at most 0.2.

Once the COF of the material to be used for manufacturing the powder carrier is known, the thickness of the layer of said material can be easily determined from the condition T×COF 10 μm. Preferably, the thickness of the layer of material to be used as powder carrier is at least 20 μm, more preferably at least 40 μm, most preferably at least 60 μm. Preferably the thickness of said layer is at most 150 μm, more preferably at most 130 μm, even more preferably at most 110 μm, most preferably at most 90 μm. With the thickness of a layer of material is herein understood the average thickness of such layer as measured e.g. with a micrometer. Preferably, the thickness variation of the layer of material forming the powder carrier used in accordance with the invention is less than 14% of its average thickness, more preferably less than 10%, most preferably less than 6%.

Preferably, the powder carrier has a length direction and a width direction. Said length direction, also called machine direction, is the direction of manufacturing the powder carrier. Said width direction is considered herein the direction perpendicular on the length direction. Preferably said powder carrier has a bending resistance as measured according to DIN 53121 in the length direction of at least 20 mN, more preferably at least 50 mN, most preferably at least 80 mN. Preferably, the bending resistance of the powder carrier in the length direction is at between 50 and 250 mN, more preferable between 70 and 200 mN, most preferably between 90 and 150 mN. The powder carrier preferably has also a bending resistance in the width direction of preferably at least 3 mN, more preferably at least 5 mN, most preferably at least 8 mN. Preferably the bending resistance of the powder carrier in the width direction is between 10 and 150 mN, more preferably between 20 and 130 mN, most preferably between 30 and 110 mN. It was observed that when the powder carrier has such a bending resistance, the density variations in the compacted polymeric powder are further reduced.

In a preferred embodiment of the invention, the powder carrier fulfills the condition of Formula 2:

$$BR \times COF \geq 7 \ mN \quad \text{Formula 2}$$

wherein BR is the bending resistance of the powder carrier in the length direction as measured according to DIN 53121. Preferably, BR×COF is at least 9 mN, more preferably at least 11 mN, most preferably at least 13 mN. The skilled person knows how to modify the bending resistance of a powder carrier in the length direction of said powder carrier. For example, the skilled person can use reinforcing materials, e.g. mineral or metallic fillers, particles and the like and routinely adjust their concentration to achieve the desired bending resistance. The skilled person knows that the higher the concentration of the reinforcing materials, the higher the bending resistance of the powder carrier. Examples of suitable filler are given in U.S. Pat. No. 6,127,028 included herein by reference and in particular from column 5, line 5 to column 5, line 60. Once the skilled person determines the COF of the powder carrier he may routinely adjust its BR to comply with Formula 2.

In principle, any material may be used for the manufacturing of the layer forming the powder carrier. Once a layer is formed, its static COF can be determined according to the modified ASTM D1894-08, and its thickness or bending resistance (BR) adjusted such that the layer of material complies with Formula 1 and/or Formula 2. Preferably, the material used for the manufacturing of the layer forming the powder carrier is a synthetic material, more preferably a polymeric material, most preferably a cellulosic material, Preferably, the material used for the manufacturing of the layer forming the powder carrier is a synthetic material, more preferably a plastic material. Preferably, the plastic material is chosen from the group consisting of polyester, polyamides and polyaramides, poly(tetrafluoroethylene), nylon and polyolefins. These plastic materials can be easily shaped into layers according to known methods in the art, e.g. extrusion or compression moulding. Once a layer of such materials is formed, its static COF can be determined according to the modified ASTM D1894-08 and its thickness or bending resistance (BR) adjusted such that the layer complies with Formula 1 and/or Formula 2.

Most preferably, the material used for the manufacturing of the layer forming the powder carrier is a cellulosic material, said cellulosic material being preferably derived from wood or rags. The layer of cellulosic material may also contains additives or reinforcing materials such as succinic acid (dihydro-2.5-furandione), polyvinylalcohol, hydroxyethylcellulose, carboxymethylcellulose, rosin, acrylic co-polymers, hydrocolloids, clay, latex and starch. The amounts of additives or reinforcing materials may vary widely. For example, increasing the concentration of reinforcing materials, a stronger cellulosic material is obtained. Examples of cellulosic materials include technical papers, packaging papers, release liners, cigarette paper, kraft paper, alkaline paper, machine finished papers, machine glazed papers and other industrial papers. Such papers are known in the art and can be obtained commercially in different thicknesses. Once such a paper is obtained, its static COF can be determined according to the modified ASTM D1894-08 and its thickness or bending resistance (BR) adjusted such that the layer complies with Formula 1 and/or Formula 2.

The invention further relates to a compacted polymeric powder according to the invention in the form of a tape.

By tape is herein understood an elongated body having a length (L), width (N) and thickness (T), wherein the length (L) is much larger than the thickness (T). The width (N) of the tape may be comparable with the length of the tape, in such a case the tape being also referred to as film, or it may be much smaller than said length. The tape may have a cross sectional aspect ratio of at least 5:1, more preferably at least 20:1, even more preferably at least 100:1 and yet even more preferably at least 1000:1. By cross sectional aspect ratio is herein understood the ratio between the width (N) of the tape, i.e. the largest distance between two points on the perimeter of the cross section of the tape, and its average thickness (T). The thickness of the tape is herein understood as the distance between two opposite points on the perimeter of the cross section, said two opposite points being chosen such that the distance between them is perpendicular on said width of the tape. By average thickness is herein understood the average of preferably at least 10 thickness values. Both the width and the thickness of the tape can be measured for example from pictures taken with an optical or electronic microscope.

The invention also relates to a drawn polymeric tape, i.e. a rolled and drawn, tape-like shaped compacted polymeric powder obtainable by the process of the invention.

The invention relates also to a monolayer comprising the drawn polymeric tapes of the invention. Preferably the drawn polymeric tapes are arranged in the monolayer in a unidirectional fashion, i.e. the tapes run along a common direction which is parallel to the tapes' length, more preferably said tapes are partially overlapping or abutting, with or without a gap thereinbetween. In a preferred embodiment of the sheet of the invention, the monolayer comprises woven drawn polymeric tapes.

The invention also relates to a ballistic resistant article, i.e. an article able to withstand a ballistic impact, the article comprising a plurality of monolayers of the invention. Preferably, said article is chosen from the group consisting of panels, bullet-proof vests and shields.

The invention also relates to the use of a layer of a material, said layer having properties as presented hereinabove as a powder carrier in a process for compacting polymeric powders; and more in particular to the use of a layer of a material for the above mentioned purpose, said layer having a thickness (T) and a static coefficient of friction (COF), wherein T×COF is at least 10 µm.

Methods

IV for UHMWPE is determined according to ASTM D4020 at 135° C. using decalin as solvent for UHMWPE in accordance with said ASTM standard.

The tensile properties of tapes: tensile strength and tensile modulus are defined by and determined with a modified version of ASTM D882 wherein the measurements are carried out at 25° C. on a tape with a width of 2 mm and a length of 200 mm, using a nominal gauge length of the tape of 131 mm, and a crosshead speed of 250 mm/min.

COF of a layer of material is determined in accordance with a modified version of ASTM D1894-08 by using a Zwick 1474 machine in a sliding friction test. The Zwick 1474 machine (100) comprises a glass moving table (101) onto which a sample (102) of the layer of material to be tested is mounted; a sled (105) for applying a load on the sample (102); a load-cell (108) to monitor the friction force; and a string (107) made of UHMWPE fibers known as Dyneema® SK75 and having a titer of about 440 dtex connecting the load-cell (108) to the sled (105). A sheet (103) of UHMWPE was mounted with the help of a double-sided tape (104) on the sled (105) and then brought into contact with the surface of the sample (102). As shown in a front view of the setup, the width (1021) of the sample (102) was chosen to correspond with the width (1031) the UHMWPE sheet (103) and said sheet (103) was placed unto said sample (102) so that their entire surfaces fully overlapped each other. Care was taken to avoid that even small regions on the surface of the UHMWPE sheet are out of contact with the surface of the sample. The UHMWPE sheet was 1 mm thick and had a length and a width of 50 mm each. The sheet of UHMWPE was obtained by compressing a GUR X 168 (from Tycona) UHMWPE powder between two steel plates having a roughness of less than 0.22 µm with a pressure of about 50 bar at a temperature of about 137° for about 5 minutes. An additional 1000 g weight (106) was placed on the sled (105). The total weight applied on the sample, i.e. the sum of the weights of the sled (105), the UHMWPE sheet (103), the double-sided tape (104) and that of the additional weight (106), amounted to about 1200 g. The load $F_n$ (in N) applied on the sample was calculated by multiplying 9.8 m/s with the total weight applied on the sample. The friction force (F) was determined with the load-cell (108) by displacing the glass moving table (101) with a speed of 150 mm/min in the direction of the arrow (109) and recording the force (201) on the load-cell (108) versus the displacement (202) to obtain a graph (200). From the recorded graph (200), the friction force considered for the purpose of the invention was the force corresponding to the highest peak (203) occurring in the first 10 mm displacement (204). The static COF was determined according to Formula 3:

$$\text{static } COF = \frac{F}{F_n} \quad \text{Formula 3}$$

It is important to note that in the entire procedure, gloves were used to avoid any surface contamination.

Bending resistance of a powder carrier was measured according to DIN 53121. The machine (500) used for measurements contained a clamping device (502) which can pivot around a pivoting axis (501); and a force sensor (504) with an adjustable blunt knife (505). The sample (506) used had a length of 50 mm and width of 38 mm. A bending angle (507) of 15° was used, and a testing distance (503) between the pivoting axis (501), i.e. the distance between the clamping mechanism and the detection point of the load cell, of 10 mm.

EXAMPLE AND COMPARATIVE EXPERIMENT

Example

An UHMWPE powder having weight average molecular weight (Mw) of between 4 and 5 million, an average particle size of 275 μm and a bulk density of about 0.25 g/cm$^3$, was formed into a powder bed of thickness of about 1.0 mm on a cellulosic powder carrier. The cellulosic powder carrier had a thickness of 80.5 μm and a COF of 0.178 and it was purchased from Mondi Group (NL) under the name of NAT 85 g SC Silox 0/0. For this powder carrier the product T×COF was 14.3 μm. The cellulosic powder carrier had a bending resistance in the length direction of 113 mN, and on the width direction of 48 mN. The product BR×COF was about 20.1 mN. The powder carrier with the powder bed on top was subjected to compaction in a double belt isochoric press. The compaction pressure was 35 bars and the compaction temperature was 137° C.

The compacted polymeric powder that resulted is presented in FIG. 3(*a*) and showed almost no ribbing and little density variation over its surface.

Comparative Experiment

Example was repeated with the difference that the powder was compressed with a powder carrier having a T×COF of 5.2 μm and a BR×COF of 2.2 mN. The powder carrier was purchased also from Mondi Group under the name of BL 40 g MGA Silox D3H/0.

As can be seen in FIG. 3(*b*), the compacted polymeric powder that resulted showed enhanced ribbing (100) which are visible as whiter stripes in FIG. 3(*b*) and large density variation over the sample's surface.

The invention claimed is:

1. A process for compacting a polymeric powder in a press, wherein the process comprises supporting the polymeric powder during compaction in the press by a powder carrier, wherein the powder carrier comprises a layer of a thickness (T), wherein the layer comprises a material with a static coefficient of friction (COF), and wherein T×COF is at least 10 μm.

2. The process of claim 1 which further comprises compacting the polymeric powder in an isochoric or an isobaric press.

3. The process of claim 1 which further comprises a step of roll-pressing the compacted polymeric powder to form an undrawn polymeric tape.

4. The process of claim 1 wherein the polymeric powder comprises particles having an average particle size of up to 1000 μm.

5. The process of claim 1 wherein the polymeric powder has a bulk density determined in accordance with ASTM-D1895 of below 0.6 g/cm$^3$.

6. The process of claim 1 wherein the polymeric powder is a powder of ultra high molecular weight polyethylene (UHMWPE).

7. The process of claim 6 wherein the UHMWPE powder is a powder of a polyethylene having a weight average molecular weight (Mw) of at least 100,000 g/mol.

8. The process of claim 1 which comprises forming a powder bed of the polymeric powder on the powder carrier, said powder bed having a thickness of at most 60 mm.

9. The process of claim 1 wherein the thickness (T) of the layer is at least 20 μm.

10. The process of claim 1 wherein the powder carrier has a length direction and a width direction, and wherein the powder carrier has a bending resistance as measured according to DIN 53121 in the length direction of at least 20 mN.

11. The process of claim 1 wherein the powder carrier has a bending resistance (BR) and a coefficient of friction (COF) such that BR×COF≥7 mN.

12. The process of claim 1 wherein the material comprising the layer forming the powder carrier is a cellulosic material.

13. The process of claim 3, which further comprises a step of stretching the undrawn polymeric tape to form a drawn polymeric tape.

14. The process of claim 7 wherein the UHMWPE powder has a Mw/Mn ratio of at most 6.

15. The process of claim 12 wherein the cellulosic material is derived from wood or rags.

16. A compacted polymeric powder obtained by the process of claim 1.

17. The compacted polymeric powder according to claim 16 which is further rolled and drawn.

18. A ballistic resistant article comprising the compacted polymeric powder of claim 17.

* * * * *